US012387678B2

(12) United States Patent
Kang et al.

(10) Patent No.: US 12,387,678 B2
(45) Date of Patent: Aug. 12, 2025

(54) DISPLAY DEVICE

(71) Applicant: LG Display Co., Ltd., Seoul (KR)

(72) Inventors: Jieun Kang, Jeonju-si (KR); Jung-Min Lee, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/537,684

(22) Filed: Dec. 12, 2023

(65) Prior Publication Data

US 2024/0221662 A1 Jul. 4, 2024

(30) Foreign Application Priority Data

Dec. 30, 2022 (KR) ........................ 10-2022-0190299

(51) Int. Cl.
*G09G 3/3233* (2016.01)
*G09G 3/20* (2006.01)

(52) U.S. Cl.
CPC ......... *G09G 3/3233* (2013.01); *G09G 3/2022* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2320/0252* (2013.01); *G09G 2330/021* (2013.01); *G09G 2340/0435* (2013.01)

(58) Field of Classification Search
CPC .. G09G 3/2022; G09G 3/3208; G09G 3/3233; G09G 3/3266; G09G 2300/0819; G09G 2300/0842; G09G 2300/0861; G09G 2310/08; G09G 2320/0247; G09G 2320/0252; G09G 2320/0271; G09G 2330/021; G09G 2340/0435
USPC ........................................ 345/212, 214, 215
See application file for complete search history.

(56) References Cited

U.S. PATENT DOCUMENTS

2016/0035297 A1* 2/2016 Oh ........................ G09G 3/2092 345/94
2019/0244572 A1* 8/2019 Le ........................ G09G 3/3406
2022/0108656 A1* 4/2022 Lee ...................... G09G 3/3275

FOREIGN PATENT DOCUMENTS

KR 10-2021-0082865 A 7/2021

* cited by examiner

*Primary Examiner* — Julie Anne Watko
(74) *Attorney, Agent, or Firm* — Fenwick & West LLP

(57) ABSTRACT

The display device includes a pixel circuit, wherein the pixel circuit includes: a light-emitting element configured to emit light based on a driving current; a driving transistor configured to control the driving current, and including a gate electrode, a source electrode, and a drain electrode, wherein a data voltage is applied to the source electrode; a storage capacitor connected to and disposed between the gate electrode of the driving transistor and a power voltage; and a reset transistor configured to apply an initialization voltage to an anode electrode of the light-emitting element in response to a scan signal, wherein when the display device operates in a Variable Refresh Rate mode for a refresh frame, an operating frequency of the scan signal varies for an anode reset frame of the refresh frame. Thus, response and image quality characteristics at a low gray level are simultaneously improved.

21 Claims, 12 Drawing Sheets

FIG. 5

| Operating Frequency (Hz) | Refresh Rate (ms) | Anode Reset | Scan3[n] | Frame |
|---|---|---|---|---|
| 120.0 | 8.33 | 4.167ms | 120Hz | Main Display Frame |
| 80.0 | 12.497 | 4.167ms | 240Hz | Visibility Improvement Frames |
| 60.0 | 16.664 | 4.167ms | 120Hz | Main Display Frame |
| 48.0 | 20.831 | 4.167ms | 240Hz | Visibility Improvement Frames |
| 40.0 | 24.998 | 4.167ms | 120Hz | Main Display Frame |
| 34.3 | 29.165 | 4.167ms | 240Hz | Visibility Improvement Frames |
| 30.0 | 33.332 | 4.167ms | 120Hz | Main Display Frame |
| 26.7 | 37.499 | 4.167ms | 240Hz | Visibility Improvement Frames |
| 24.0 | 41.666 | 4.167ms | 120Hz | Main Display Frame |
| 21.8 | 45.833 | 4.167ms | 240Hz | Visibility Improvement Frames |
| 20.0 | 50.0 | 4.167ms | 120Hz | Main Display Frame |
| 18.5 | 54.167 | 4.167ms | 240Hz | Visibility Improvement Frames |
| 17.1 | 58.334 | 4.167ms | 120Hz | Main Display Frame |
| 16.0 | 62.501 | 4.167ms | 240Hz | Visibility Improvement Frames |
| 15.0 | 66.668 | 4.167ms | 120Hz | Main Display Frame |
| 14.1 | 70.835 | 4.167ms | 240Hz | Visibility Improvement Frames |
| 13.3 | 75.002 | 4.167ms | 120Hz | Main Display Frame |
| 12.6 | 79.169 | 4.167ms | 240Hz | Visibility Improvement Frames |
| 12.0 | 83.336 | 4.167ms | 120Hz | Main Display Frame |
| 11.4 | 87.503 | 4.167ms | 240Hz | Visibility Improvement Frames |
| 10.9 | 91.67 | 4.167ms | 120Hz | Main Display Frame |
| 10.4 | 95.837 | 4.167ms | 240Hz | Visibility Improvement Frames |
| 10.0 | 100.004 | 4.167ms | 120Hz | Main Display Frame |

FIG. 9

| Operating Frequency (Hz) | Refresh Rate (ms) | Anode Reset | | Scan3[n] | Frame |
|---|---|---|---|---|---|
| 120.0 | 8.33 | | 4.167ms | 120Hz | Main Display Frame |
| 96.0 | 10.4175 | 2.0835ms | | 480Hz | First Visibility Improvement Frame |
| 80.0 | 12.497 | | 4.167ms | 240Hz | Second Visibility Improvement Frame |
| 60.0 | 16.664 | 2.0835ms | | 120Hz | Main Display Frame |
| 53.3 | 18.7515 | | 4.167ms | 480Hz | First Visibility Improvement Frame |
| 48.0 | 20.831 | 2.0835ms | | 240Hz | Second Visibility Improvement Frame |
| 40.0 | 24.998 | | 4.167ms | 120Hz | Main Display Frame |
| 36.9 | 27.0855 | 2.0835ms | | 480Hz | First Visibility Improvement Frame |
| 34.3 | 29.165 | | 4.167ms | 240Hz | Second Visibility Improvement Frame |
| 30.0 | 33.332 | | 4.167ms | 120Hz | Main Display Frame |
| 28.2 | 35.4195 | 2.0835ms | | 480Hz | First Visibility Improvement Frame |
| 26.7 | 37.499 | | 4.167ms | 240Hz | Second Visibility Improvement Frame |
| 24.0 | 41.666 | | 4.167ms | 120Hz | Main Display Frame |

DISPLAY DEVICE

CROSS-REFERENCE TO RELATED APPLICATION

This application claims priority from Korean Patent Application No. 10-2022-0190299 filed on Dec. 30, 2022 in the Korean Intellectual Property Office, and all the benefits accruing therefrom under 35 U.S.C. 119, the contents of which in its entirety are herein incorporated by reference.

BACKGROUND

Field

The present disclosure relates to a display device, and more particularly, to a display device of capable of visibility improvement in operation in a VRR (Variable Refresh Rate) mode.

Description of Background Art

As the information society develops, demand for a display device for displaying an image is increasing in various forms. In this response, various display devices such as a liquid crystal display device and an organic light-emitting display device are being utilized.

The organic light-emitting display device does not require a separate light source and thus is in the limelight as means for vivid color display. The organic light-emitting display device uses an organic light-emitting diode as a self-light-emitting element, and thus has advantages such as fast response speed, high contrast ratio, high light-emitting efficiency, high luminance, and wide viewing angle.

SUMMARY

The organic light-emitting display device implements low power consumption by using a VRR (Variable Refresh Rate) scheme when using a LTPO (Low Temperature Polycrystalline Oxide) structure of a pixel circuit. An intermediate frequency is inserted to improve visibility in change in a frequency in operation in the VRR mode.

To implement the intermediate frequency, an operating frequency of a scan signal is set to a specific frequency for an anode reset frame of a refresh frame. However, when the operating frequency of the scan signal is set to the specific frequency for the anode reset frame, response characteristics deteriorate, and a stain amount increases due to anode charge delay at a low grayscale.

A technical purpose according to an embodiment of the present disclosure is to provide a display device that may simultaneously improve response characteristics and image quality characteristics at the low grayscale in operation in the VRR mode.

Moreover, a technical purpose according to an embodiment of the present disclosure is to provide a display device capable of further improving visibility in the frequency change in operation in the VRR mode.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A display device according to one embodiment of the present disclosure includes a pixel circuit, wherein the pixel circuit includes: a light-emitting element configured to emit light based on a driving current; a driving transistor configured to control the driving current, and including a gate electrode, a source electrode, and a drain electrode, wherein a data voltage is applied to the source electrode; a storage capacitor connected to and disposed between the gate electrode of the driving transistor and a power voltage; and a reset transistor configured to apply an initialization voltage to an anode electrode of the light-emitting element in response to a scan signal, wherein when the display device operates in a VRR (Variable Refresh Rate) mode for a refresh frame, an operating frequency of the scan signal varies for an anode reset frame.

A display device according to another embodiment of the present disclosure includes a display panel including a plurality of pixel circuits, each pixel circuit having a light-emitting element and a driving transistor; and a gate driver for providing a scan signal to the plurality of pixel circuits, wherein the scan signal is set as a control signal for initializing an anode electrode of the light-emitting element and for applying an on-bias stress voltage to a source electrode of the driving transistor, wherein the gate driver is controlled so that in a VRR (variable refresh rate)-based operation for a refresh frame, an operating frequency of the scan signal varies for an anode reset frame.

According to the embodiments, the response characteristics and the image quality characteristics at the low gray level in the operation in the VRR mode may be simultaneously improved.

Moreover, the visibility in the frequency change in operation in the VRR mode may be further improved.

Moreover, the low-speed operation may reduce the power consumption, and thus the display panel may operate at a low power level.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

BRIEF DESCRIPTION OF DRAWINGS

FIG. 5 is a diagram illustrating a refresh rate and an operating frequency of a scan signal based on a variable operating frequency in a display device according to the first embodiment.

FIG. 9 is a diagram illustrating a refresh rate and an operating frequency of a scan signal based on a variable operating frequency in a display device according to the third embodiment.

DETAILED DESCRIPTIONS

Figure 1:
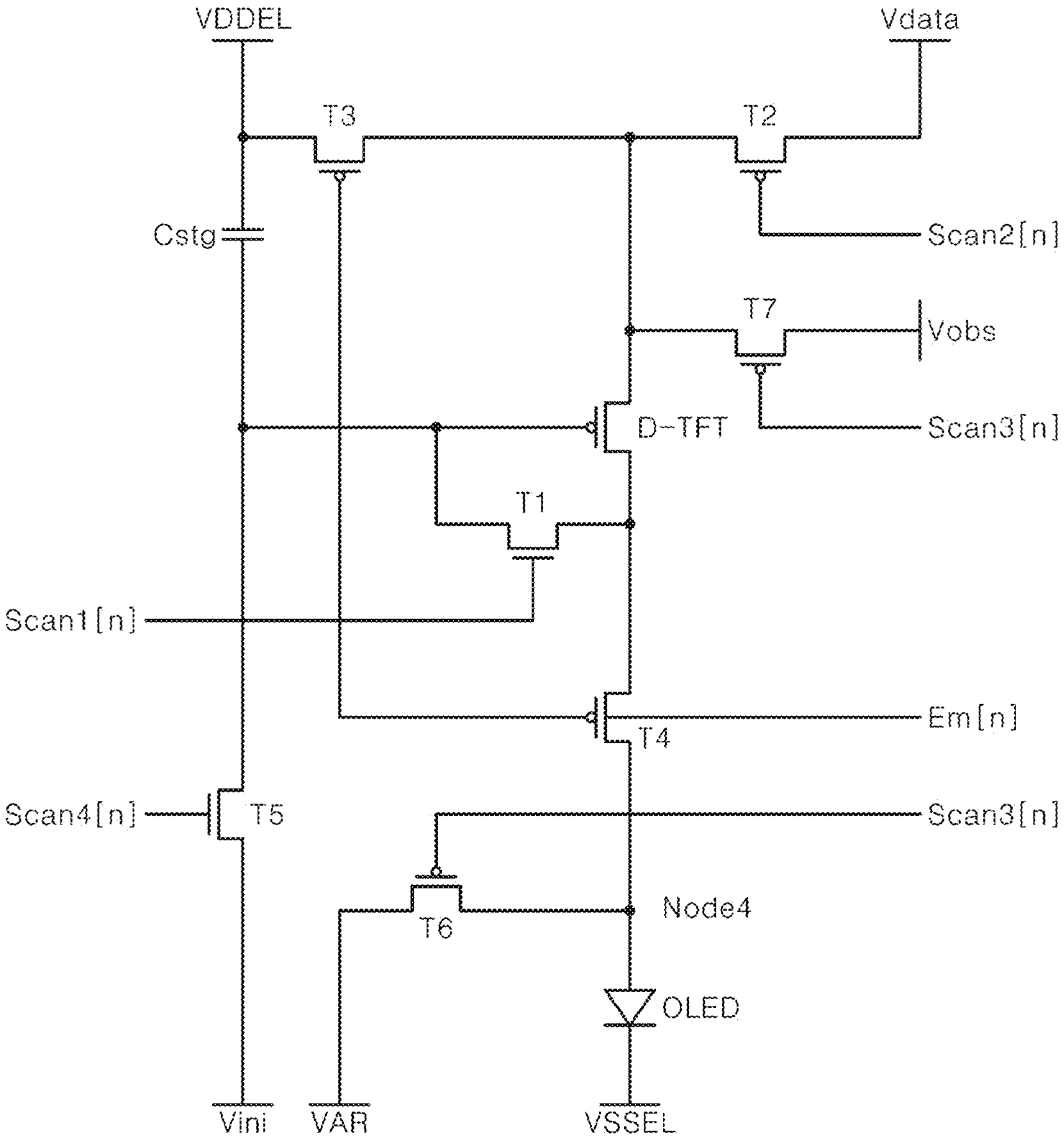
FIG. 1 is a circuit diagram showing a pixel circuit of a display device according to an embodiment.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects", and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the detailed descriptions.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, a display device according to some embodiments will be described.

Prior to describing the display device according to embodiments, the meaning of terms used in the present disclosure is defined.

As used herein, a frame may be a concept of a temporal period. In some cases, the frame may have meanings such as an image or an operation mode.

As used herein, a refresh frame may be defined as a period of initializing a pixel circuit and programming a data voltage. The refresh frame may be divided into a stress period, an initialization period, and a sampling period.

As used herein, the anode reset frame may be defined as a period during which an initialization voltage is applied to an anode electrode of a light-emitting element, and an on-bias stress voltage is applied to a source electrode of a driving transistor, when the display device operates in a VRR (variable refresh rate) mode.

FIG. 1 is a circuit diagram showing a pixel circuit of a display device according to an embodiment.

Referring to FIG. 1, the pixel circuit is composed of a light-emitting element OLED, a driving transistor D-TFT, a first transistor T1, a storage capacitor Cstg, a second transistor T2, a third transistor T3, a fourth transistor T4, a fifth transistor T5, a sixth transistor T6 and a seventh transistor T7.

The light-emitting element OLED emits light based on a driving current. The light-emitting element OLED is embodied as an organic light-emitting diode, and is comprised of an anode electrode, a cathode electrode, and an organic light-emissive layer between the anode electrode and the cathode electrode. The anode electrode is connected to the driving transistor D-TFT via the fourth transistor T4. The cathode electrode is connected to a low-potential voltage VSSEL.

The driving transistor D-TFT controls the driving current, and includes a gate electrode, a source electrode and a drain electrode. A data voltage Vdata is applied to the source electrode of the driving transistor D-TFT, while the anode electrode of the light-emitting element OLED is connected to the drain electrode of the driving transistor D-TFT.

The first transistor T1 is connected to and disposed between the gate electrode and the drain electrode of the driving transistor D-TFT. Further, the first transistor T1 is connected to and disposed between the storage capacitor Cstg and the drain electrode of the driving transistor D-TFT. The first transistor T1 connects the gate electrode and the drain electrode of the driving transistor D-TFT to each other in response to a first scan signal Scan1[*n*], and connects the storage capacitor Cstg and the drain electrode of the driving transistor D-TFT to each other in response to the first scan signal Scan1[*n*].

The second transistor T2 is connected to and disposed between the data voltage Vdata and the source electrode of the driving transistor D-TFT. Further, the second transistor T2 is connected to and disposed between the data voltage Vdata and the third transistor T3. The second transistor T2 applies the data voltage Vdata to the source electrode of the driving transistor D-TFT in response to a second scan signal Scan2[*n*].

The third transistor T3 is connected to and disposed between a power voltage VDDEL and the source electrode of the driving transistor D-TFT. The third transistor T3 applies the power voltage VDDEL to the source electrode of the driving transistor D-TFT in response to an emission signal Em[n].

The fourth transistor T4 is connected to and disposed between the drain electrode of the driving transistor T3 and the anode electrode of the light-emitting element OLED. The fourth transistor T4 generates a current path between the driving transistor T3 and the light-emitting element OLED in response to the emission signal Em[n]. Luminance or gradation of the light-emitting element OLED is determined based on a current intensity of the current path. The current intensity of the current path is determined based on the data voltage Vdata corresponding to the image data.

The fifth transistor T5 is connected to and disposed between the gate electrode of the driving transistor D-TFT and a first initialization voltage Vini. Further, the fifth transistor T5 is connected to and disposed between the storage capacitor Cstg and the first initialization voltage Vini. The fifth transistor T5 applies a first initialization voltage Vini to the gate electrode of the driving transistor D-TFT and one electrode of the storage capacitor Cstg in response to a fourth scan signal Scan4[*n*].

The storage capacitor Cstg has one electrode connected to the power voltage VDDEL and the third transistor T3 and the other electrode connected to the gate electrode of the driving transistor D-TFT and the fifth transistor T5. The storage capacitor Cstg samples the data voltage Vdata according to operation of the second transistor T2, driving transistor D-TFT, and the first transistor T1, and is initialized with the first initialization voltage Vini according to operation of the fifth transistor T5.

The sixth transistor T6 is connected to and disposed between the anode electrode of the light-emitting element OLED and a second initialization voltage VAR. The sixth transistor T6 applies the second initialization voltage VAR to the anode electrode of the light-emitting element OLED in response to a third scan signal Scan3[*n*]. As used herein, the sixth transistor T6 may be referred to as a reset transistor.

The seventh transistor T7 is connected to and disposed between the source electrode of the driving transistor D-TFT and an on-bias stress voltage Vobs. The seventh transistor T7 applies the on-bias stress voltage Vobs to the source electrode of the driving transistor D-TFT in response to the third scan signal Scan3[*n*].

The sixth transistor T6 and the seventh transistor T7 operate in response to the third scan signal Scan3 [*n*] during the anode reset frame.

In the LTPO (Low Temperature Polycrystalline Oxide) pixel structure, each of the driving transistor D-TFT, the second transistor T2, the third transistor T3, the emission transistor T4, the sixth transistor T6, and the seventh transistor T7 may be embodied as a PMOS transistor. For example, each of the driving transistor D-TFT, the second transistor T2, the third transistor T3, the emission transistor T4, the sixth transistor T6, and the seventh transistor T7 may be embodied as a P-type oxide thin-film transistor including a P-type oxide semiconductor layer. Each of the first transistor T1 and the fifth transistor T5 be embodied as an NMOS transistor. Each of the first transistor T1 and the fifth transistor T5 may be embodied as, for example, an N-type oxide thin-film transistor including an N-type oxide semiconductor layer.

In one example, the first scan signal Scan1[*n*], the second scan signal Scan2[*n*], the third scan signal Scan3[*n*] and the emission signal Em[n] may be generated from at least one gate driver and may be provided to each of pixel circuits of the display panel.

Figure 2:
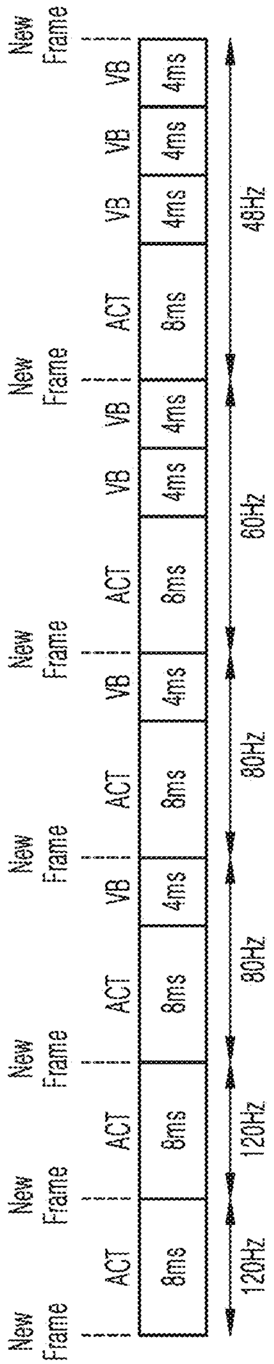
FIG. 2 is a diagram for illustrating a VRR (variable refresh rate)-based operation for a refresh frame in a display device according to an embodiment.

FIG. 2 is a diagram for illustrating a VRR (variable refresh rate)-based operation for a refresh frame in a display device according to an embodiment.

Referring to FIG. 2, the display device uses a VRR (Variable Refresh Rate) mode to implement low power consumption. Further, the display device inserts an intermediate frequency to improve visibility in the change in the frequency in operation in the VRR mode. The display device may set and apply an operating frequency of the third scan signal to a specific frequency during the anode reset frame to implement the intermediate frequency.

In one example, in operation in the VRR mode, the display device may change the operating frequency from 120 Hz to 60 Hz and may change the operating frequency from 60 Hz to 40 Hz. In this regard, in order to improve visibility in the change in the frequency in operation in the VRR mode, the display device may change the operating frequency from 120 Hz to the intermediate frequency 80 Hz before changing the operating frequency from 120 Hz to 60 Hz, and then may change the intermediate frequency 80 Hz to 60 Hz. Further, in order to improve visibility in the change in the frequency in operation in the VRR mode, the display device may change the operating frequency from 60 Hz to the intermediate frequency 48 Hz before changing the operating frequency from 60 Hz to 40 Hz, and then may change the intermediate frequency 48 Hz to 40 Hz.

Figure 3:
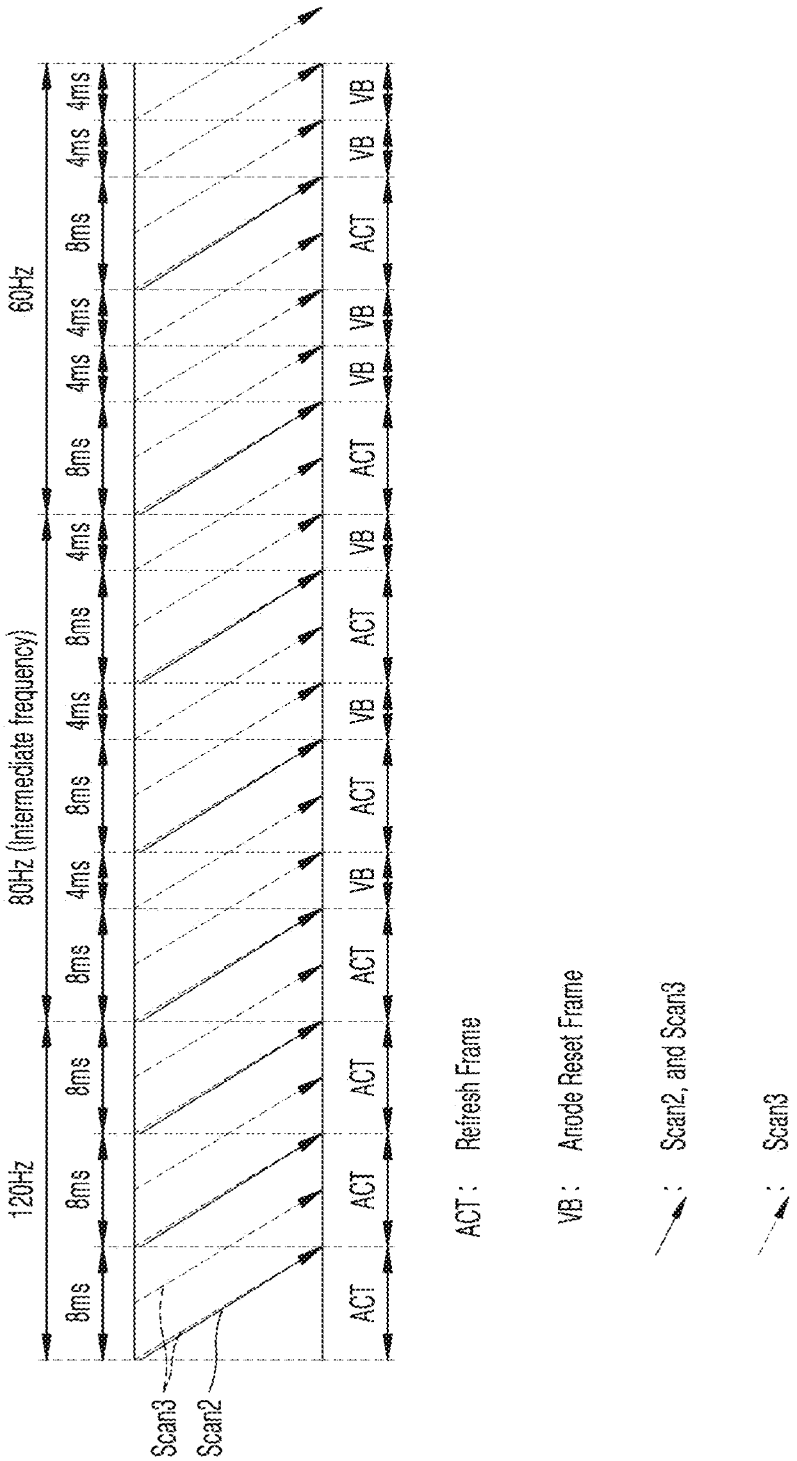
FIG. 3 is a diagram illustrating a VRR (variable refresh rate)-based operation for a refresh frame in a display device according to a first embodiment.
Figure 4:
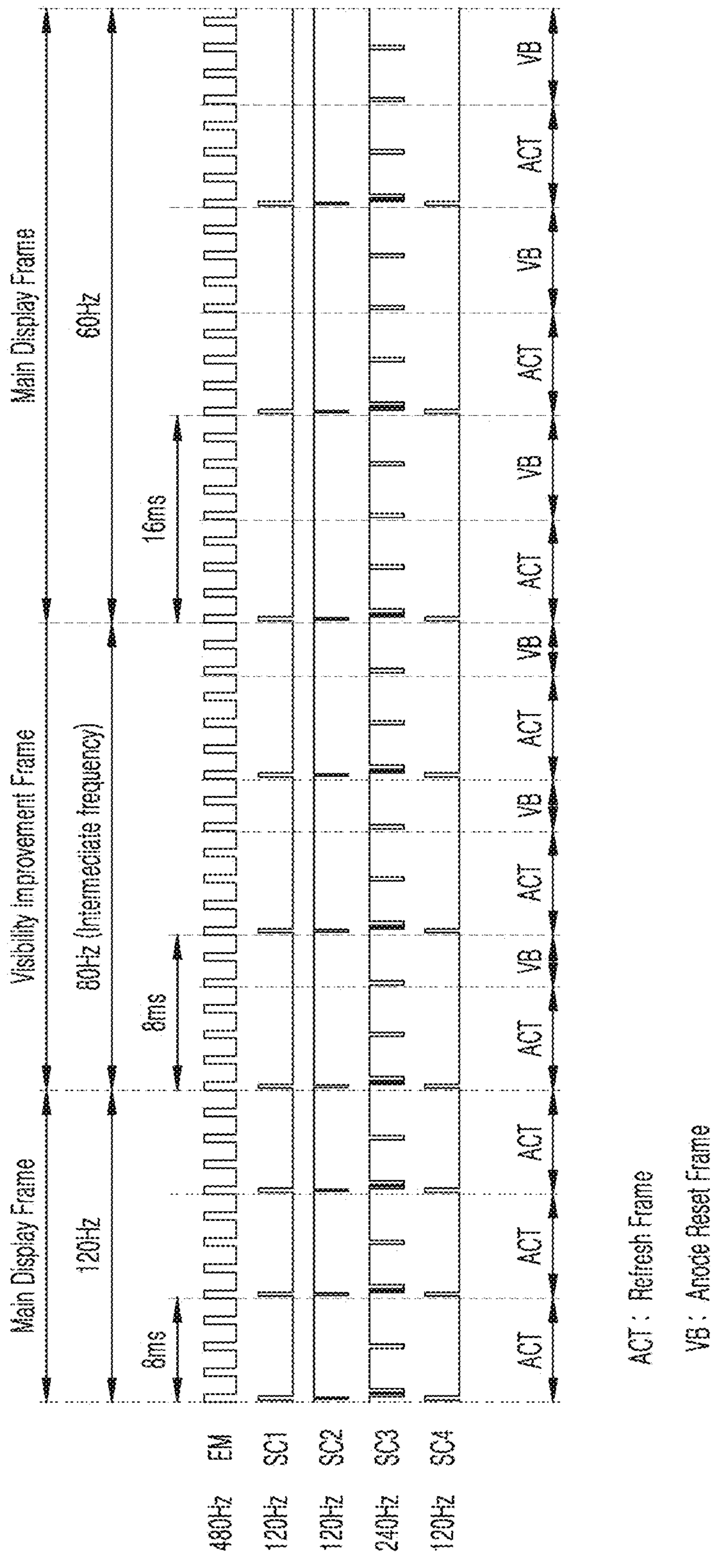
FIG. 4 is a timing diagram of a pixel circuit in a VRR (variable refresh rate)-based operation for a refresh frame in the display device according to the first embodiment.

In FIG. 2, FIG. 3, and FIG. 4, ACT may correspond to a refresh frame and VB may correspond to an anode reset frame. In one example, the refresh frame may operate for 8 ms. The anode reset frame may operate for 4 ms.

FIG. 3 is a diagram illustrating a VRR (variable refresh rate)-based operation for a refresh frame in a display device according to a first embodiment. FIG. 4 is a timing diagram of the pixel circuit in a VRR (variable refresh rate)-based operation for a refresh frame in the display device according to the first embodiment.

Referring to FIG. 3 and FIG. 4, the display device sets an operating frequency of the anode reset frame to 240 Hz corresponding to 4 ms. Thus, the anode reset frame may operate for 4 ms. During the anode reset frame, the on-bias stress voltage Vobs and the second initialization voltage VAR are applied to the pixel circuit.

The display device inserts intermediate frequencies 80 Hz, 48 Hz, etc. in order to improve visibility in operation in the VRR mode. In this regard, in order to use the intermediate frequency, the anode reset frame should operate for 4 ms. In other words, the operating frequency of the third scan signal Scan3[*n*] should be 240 Hz.

However, when the anode reset frame is 4 ms, the operating frequency of the third scan signal Scan3[*n*] is set to 240 Hz, such that the anode charge delay of a main display frame increases. This may cause degradation of response characteristics and increase in the stain amount due to the anode charge delay at a low grayscale.

In this regard, the main display frame may be defined as a period for which the data voltage is applied to the pixel circuit to program the data voltage therein. In one example, the main display frame may be exemplified as a period for which the operating frequency of the second scan signal Scan2[*n*] is set to 120 Hz, 60 Hz, 40 Hz, etc., rather than the intermediate frequency.

FIG. 5 is a diagram illustrating a refresh rate and an operating frequency of a scan signal based on a variable operating frequency in a display device according to the first embodiment.

Referring to FIG. 5, the display device may reduce the operating frequency for low power operation. The refresh rate may be varied according to the decrease in the operating frequency, and a visibility improvement frame may be inserted between main display frames.

In this regard, the visibility improvement frame may be defined as a period for which an operating frequency is set to an intermediate frequency between operating frequencies of main display frames. In one example, the operating frequency of the visibility improvement frame may be set to the intermediate frequency such as 80 Hz or 48 Hz. The display device according to the first embodiment may set the operating frequency of the anode reset frame of the visibility improvement frame, that is, the operating frequency of the third scan signal to 240 Hz.

Figure 6:
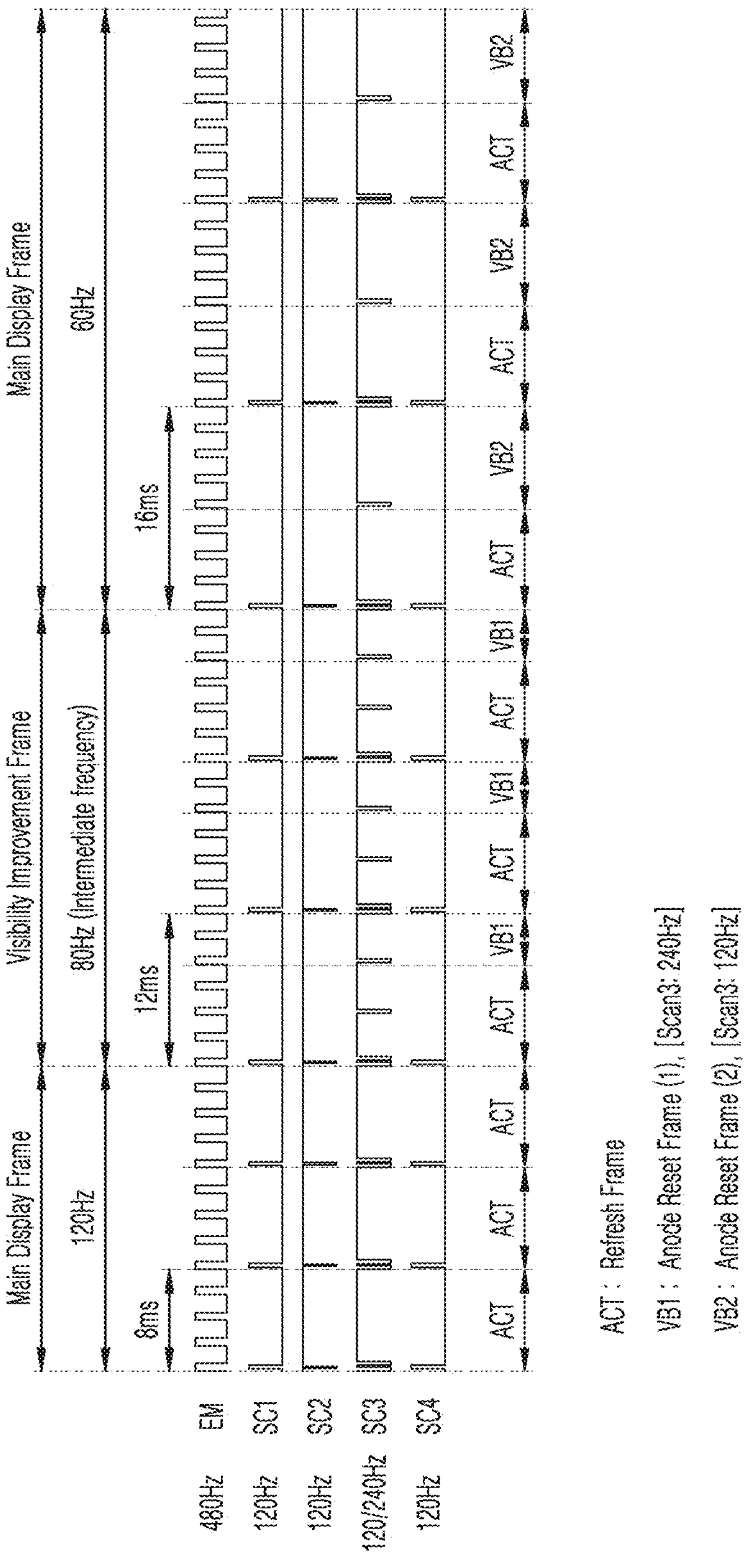
FIG. 6 is a diagram illustrating a VRR (variable refresh rate)-based operation for a refresh frame in a display device according to a second embodiment.
Figure 7:
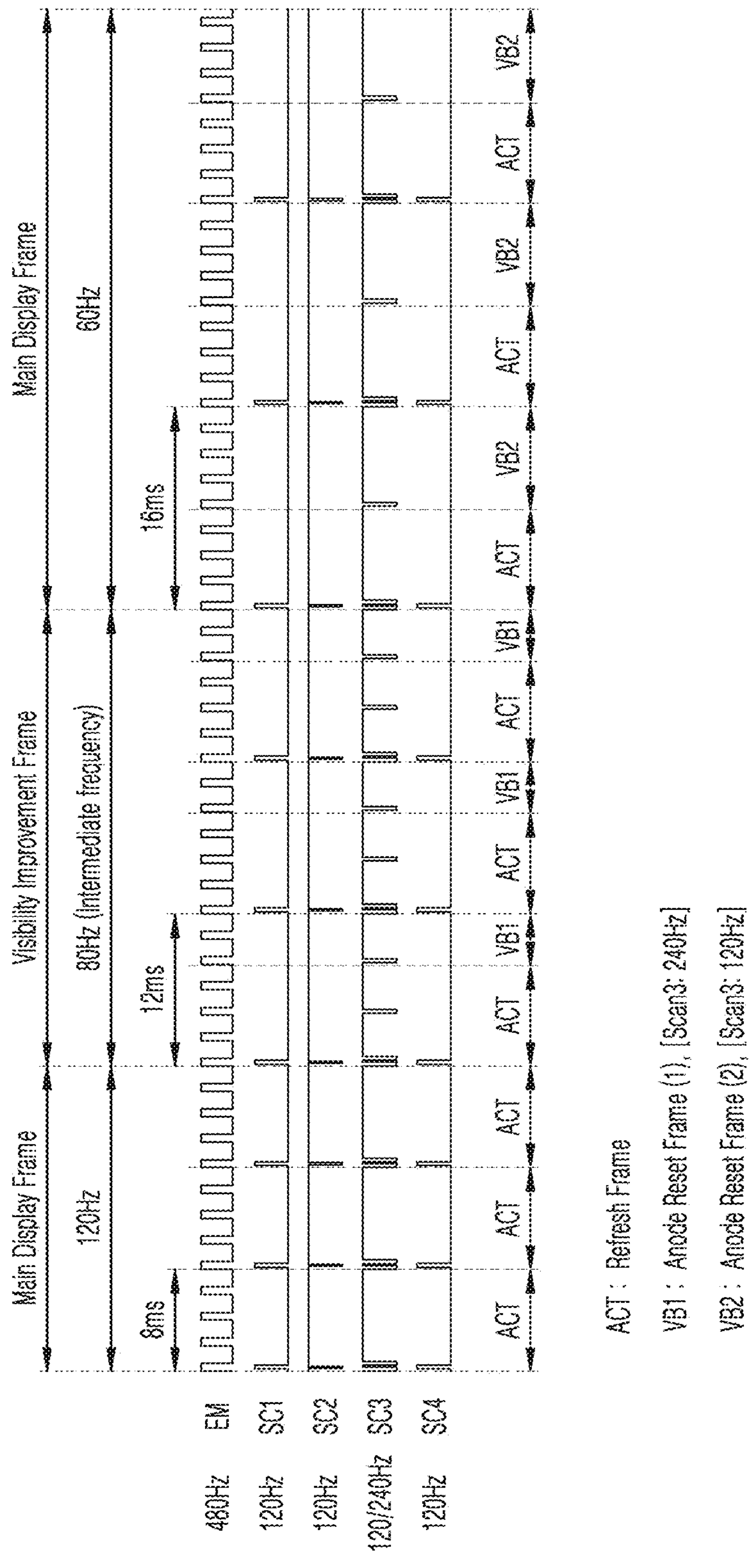
FIG. 7 is a timing diagram of a pixel circuit in a VRR (variable refresh rate)-based operation of a refresh frame in a display device according to the second embodiment.

FIG. 6 is a diagram illustrating a VRR (variable refresh rate)-based operation for a refresh frame in a display device according to a second embodiment. FIG. 7 is a timing diagram of a pixel circuit in operation in the VRR mode for a refresh frame in a display device according to the second embodiment. In FIG. 6 and FIG. 7, ACT may correspond to a refresh frame, VB1 may correspond to an anode reset frame (1), and VB2 may correspond to an anode reset frame (2).

Referring to FIG. 6 and FIG. 7, the display device according to the second embodiment varies the operating frequency of the third scan signal Scan3[*n*] for the anode reset frame in operation in the VRR mode for the refresh frame.

When the display device operates in the VRR mode for the refresh frame, the refresh frame is divided into a first main display frame, the visibility improvement frame, and a second main display frame.

The display device may set the operating frequency of the first main display frame to a first frequency, may set the operating frequency of the visibility improvement frame to the intermediate frequency, and may set the operating frequency of the second main display frame to a second frequency. In one example, the first frequency may be 120 Hz, the second frequency may be 60 Hz, and the intermediate frequency may be set to 80 Hz, which is a value between the first frequency and the second frequency.

The display device changes the operating frequency of the third scan signal Scan3[*n*] to a third frequency for the anode reset frame of the visibility improvement frame. In one example, the value of the third frequency may be set to 240 Hz. The display device changes the operating frequency of the third scan signal Scan3[*n*] to the first frequency 120 Hz for the anode reset frame of the second main display frame.

In other words, the display device may set the operating frequency of the third scan signal Scan3[*n*] to 240 Hz at the intermediate frequency that the anode reset frame requires, for example, at 80 Hz, and may set the operating frequency of the third scan signal Scan3[*n*] to 120 Hz at the main display frame, for example, 120 Hz and 60 Hz.

In this way, the operating frequency of the third scan signal Scan3[*n*] may be changed for the anode reset frame. Thus, the anode charge delay of the main display frame may be reduced, and thus the image quality characteristics, and low grayscale response characteristics may be improved.

Figure 8:
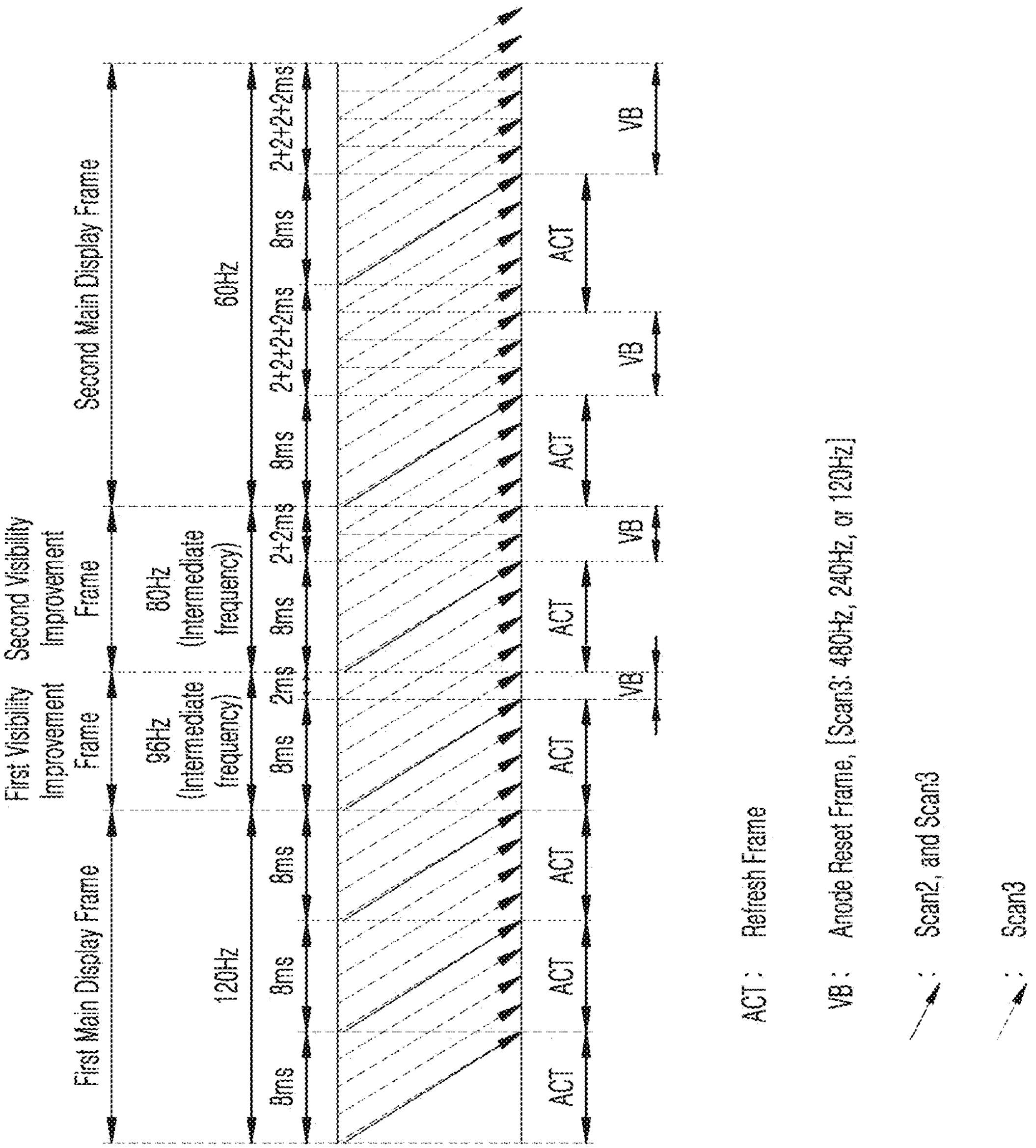
FIG. 8 is a diagram illustrating a VRR (variable refresh rate)-based operation for a refresh frame in a display device according to a third embodiment.

FIG. 8 is a diagram illustrating a VRR (variable refresh rate)-based operation for a refresh frame in a display device according to a third embodiment. FIG. 9 is a diagram illustrating a refresh rate and an operating frequency of a scan signal based on a variable operating frequency in a display device according to the third embodiment.

Referring to FIG. 8 and FIG. 9, when the device operates in the VRR mode for the refresh frame, the display device according to the third embodiment may divide the refresh frame to the first main display frame, a first visibility improvement frame, a second visibility improvement frame, and the second main display frame. In FIG. 8, ACT may correspond to a refresh frame, VB may correspond to an anode reset frame.

The display device may set the operating frequency of the first main display frame to the first frequency, may set the operating frequency of the first visibility improvement frame to a first intermediate frequency, may set the operating frequency of the second visibility improvement frame to a second intermediate frequency, and may set the operating frequency of the second main display frame to the second frequency. In one example, the first frequency may be 120 Hz, the second frequency may be 60 Hz, the first intermediate frequency may be set to 96 Hz which is a value between the first frequency and the second frequency, and the second intermediate frequency may be set to 80 Hz which is a value between the first frequency and the second frequency.

The display device changes the operating frequency of the third scan signal Scan3[*n*] to the fourth frequency in the first visibility improvement frame, the second visibility improvement frame, and the second main display frame, which require the anode reset frame. In one example, the fourth frequency may be set to 480 Hz.

In this regard, the display device may set the anode reset frame of the first visibility improvement frame operating at the intermediate frequency of 96 Hz to 2 ms, may set the anode reset frame of the second visibility improvement frame operating at the intermediate frequency 80 Hz to 2 ms+2 ms, and may set the anode reset frame of the second main display frame operating at 60 Hz to 2 ms+2 ms+2 ms+2 ms.

In this way, for the anode reset frame of each of the first visibility improvement frame, the second visibility improvement frame, and the second main display frame, the operating frequency of the third scan signal Scan3[*n*] may be set to 480 Hz. Thus, the intermediate frequency may be set in a finer manner. The frames may be connected to each other such that noise due to the frequency fluctuation in the operation in the VRR mode may be minimized. Thus, the visibility may be further improved.

Figure 10:
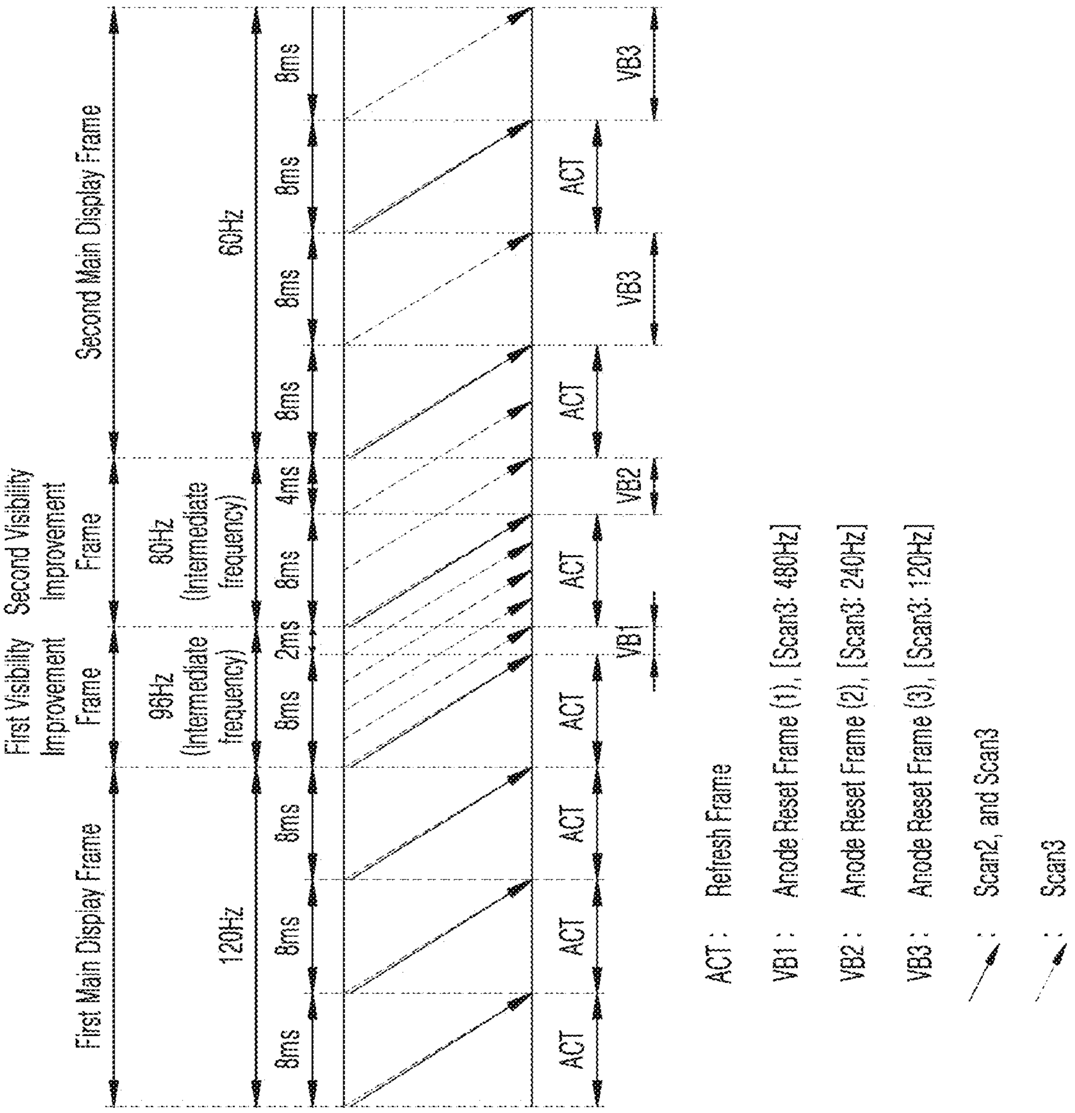
FIG. 10 is a diagram illustrating a VRR (variable refresh rate)-based operation for a refresh frame in a display device according to a fourth embodiment.
Figure 11:
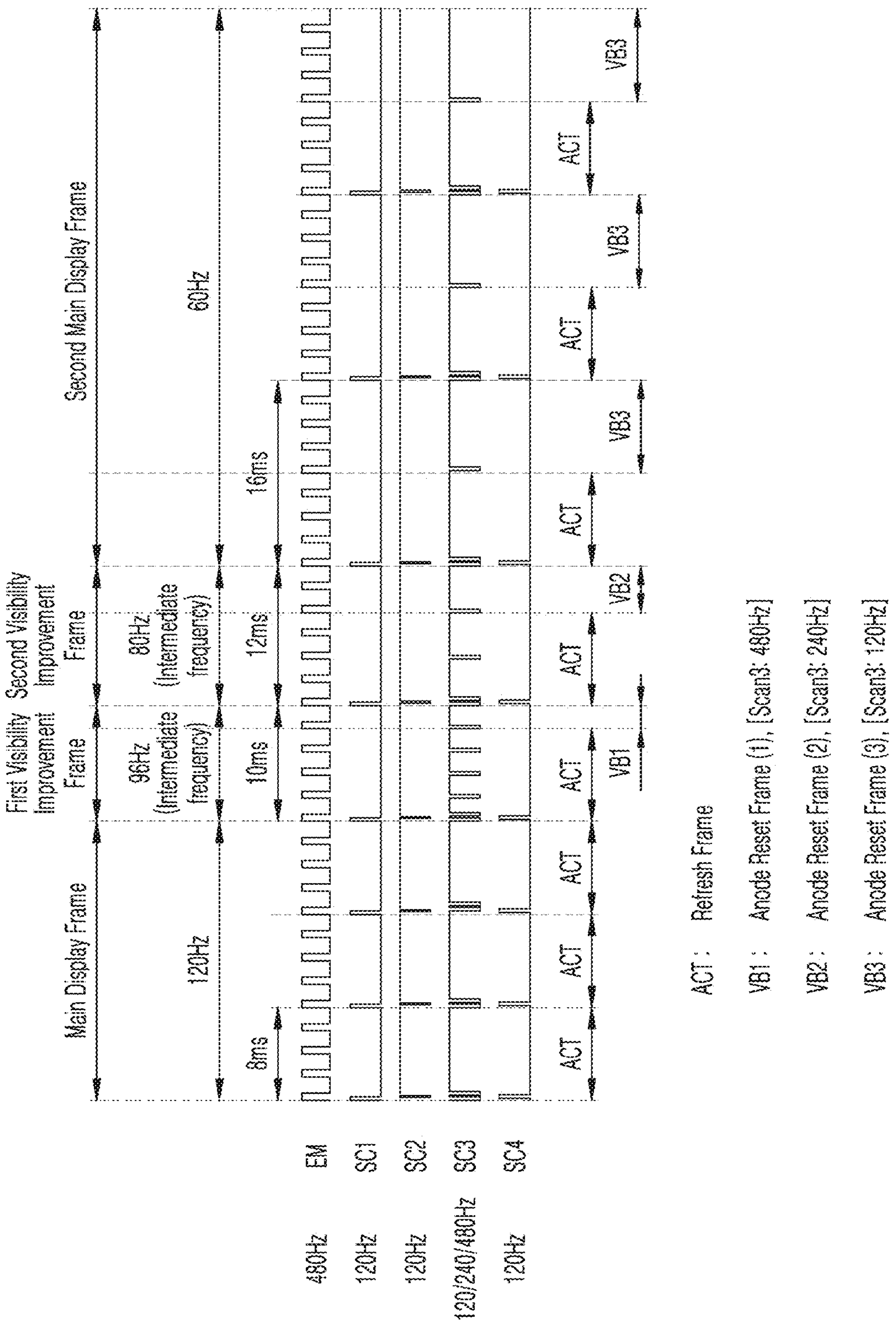
FIG. 11 is a timing diagram of a pixel circuit in operation in a VRR mode for a refresh frame in a display device according to the fourth embodiment.

FIG. 10 is a diagram illustrating a VRR (variable refresh rate)-based operation for a refresh frame in a display device according to a fourth embodiment. FIG. 11 is a timing diagram of a pixel circuit in operation in the VRR mode for a refresh frame in a display device according to the fourth embodiment. In FIG. 10 and FIG. 11, ACT may correspond to a refresh frame, VB1 may correspond to an anode reset frame (1), VB2 may correspond to an anode reset frame (2), and VB3 may correspond to an anode reset frame (3).

As in the third embodiment, when the display device according to the fourth embodiment operates in the refresh frame rate (VRR) mode, the device divides the refresh frame into the first main display frame, the first visibility improvement frame, the second visibility improvement frame, and the second main display frame.

The display device may set the operating frequency of the first main display frame to the first frequency, may set the operating frequency of the first visibility improvement frame to the first intermediate frequency, may set the operating frequency of the second visibility improvement frame to the second intermediate frequency, and may set the operating frequency of the second main display frame to the second frequency. In one example, the first frequency may be 120 Hz, the second frequency may be 60 Hz, the first intermediate frequency may be set to 96 Hz between the first frequency and the second frequency, and the second intermediate frequency may be set to 80 Hz between the first frequency and the second frequency.

The display device according to the fourth embodiment may change the operating frequency of the third scan signal Scan3[*n*] to 480 Hz for the anode reset frame of the first visibility improvement frame, may change the operating frequency of the third scan signal Scan3[*n*] to 240 Hz for the anode reset frame of the second visibility improvement frame, and may change the operating frequency of the third scan signal Scan3[*n*] to 120 Hz for the anode reset frame of the second main display frame.

As such, for the first visibility improvement frame and the second visibility improvement frame respectively operating at the intermediate frequencies of 96 Hz and 80 Hz, which require the anode reset frames of 2 ms and 4 ms, respectively, the operating frequencies of the third scan signal Scan3[*n*] may be set to 480 Hz and 240 Hz, respectively. For the anode reset frame of the second main display frame operating at 60 Hz, the operating frequency of the third scan signal Scan3[*n*] may be set to 120 Hz.

This minimizes deterioration in the visibility in the frequency fluctuation in operation in the VRR mode and at the same time, and reduces the anode charge delay of the main display frame, thereby improving response characteristics and reducing the stain amount at the low grayscale level.

Figure 12:
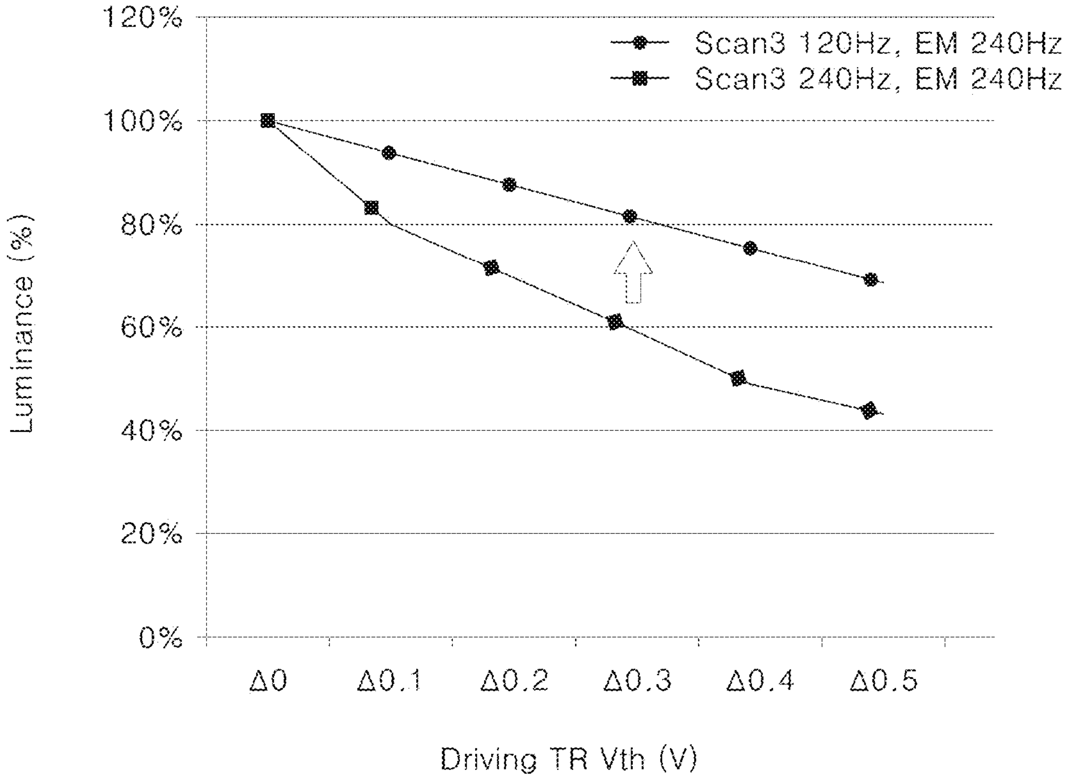
FIG. 12 shows grayscale response characteristics of a driving transistor in operation in a VRR mode in a display device according to embodiments.

FIG. 12 shows grayscale response characteristics of a driving transistor in operation in the VRR mode in a display device according to embodiments.

Referring to FIG. 12, it may be identified that when the display device according to embodiments operate in the VRR mode, the luminance characteristics based on the threshold voltage Vth of the driving transistor is improved when the driving transistor operates based on the third scan signal Scan3 and the emission signal EM whose operating frequencies are 120 Hz and 240 Hz, respectively, compared to a case when the driving transistor operates based on the third scan signal Scan3 and the emission signal EM whose operating frequencies are 240 Hz and 240 Hz, respectively.

In one example, FIG. 12 shows the luminance sensitivity based on the threshold voltage Vth of the driving transistor at the low grayscale.

Figure 13:
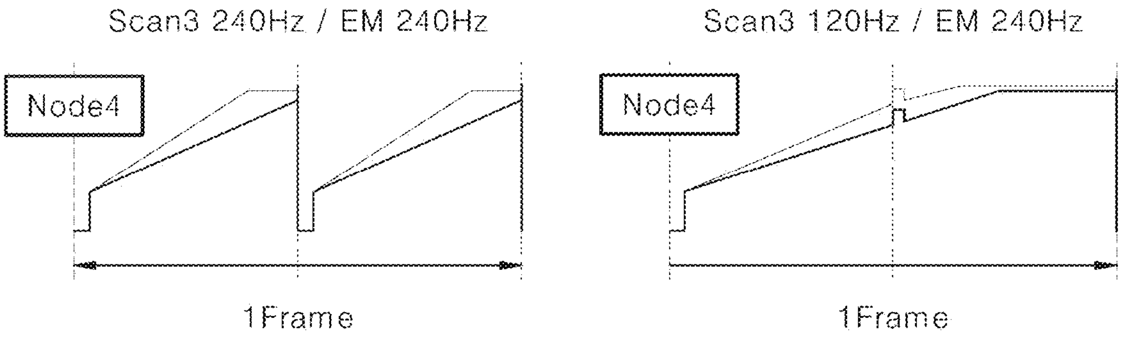
FIG. 13 shows electrical characteristics of an anode electrode of an organic light-emitting diode in operation in the VRR mode in a display device according to embodiments.

FIG. 13 shows electrical characteristics of an anode electrode of an organic light-emitting diode in operation in the VRR mode in a display device according to embodiments.

Referring to FIG. 13, it may be identified based on the electrical characteristics of the anode electrode Node4 of the light-emitting element OLED in operation in the VRR mode of the display device according to the embodiments that the charge charging time of the anode electrode of the light-emitting element OLED is reduced, and the cumulative charging deviation decreases due to decrease in the number of times of refreshes when the driving transistor operates based on the third scan signal Scan3 and the emission signal EM whose operating frequencies are 120 Hz and 240 Hz, respectively, compared to a case when the driving transistor operates based on the third scan signal Scan3 and the emission signal EM whose operating frequencies are 240 Hz and 240 Hz, respectively.

Moreover, according to embodiments, it may be identified that even when the threshold voltage Vth of the driving transistor is positively-shifted due to deterioration of the driving transistor, the electrical characteristics are improved in varying the third scan signal Scan3.

In one example, in FIG. 13, a thin line represents the electrical characteristics of the anode electrode Node4 of the light-emitting element OLED in operation in the VRR mode in a state before the driving transistor is deteriorated. In FIG. 13, a thick line represents the electrical characteristics of the anode electrode Node4 of the light-emitting element OLED in operation in the VRR mode in a state where the threshold voltage is shifted-positively due to the deterioration of the driving transistor.

In this way, in accordance with the present embodiments, even when characteristics such as the threshold voltage of the driving transistor are shifted due to the deterioration of the driving transistor, the charge charging time of the anode electrode of the light-emitting element may be reduced and the cumulative charging deviation may be reduced due to the decrease in the number of times of the refreshes in operation in the VRR mode. Thus, the visibility in the frequency change may be improved, and the response characteristics, and the image quality characteristics related to the stain at the low grayscale of the display panel may be improved at the same time.

A first aspect of the present disclosure provides a display device comprising: a pixel circuit, wherein the pixel circuit includes: a light-emitting element OLED configured to emit light based on a driving current; a driving transistor D-TFT configured to control the driving current, and including a gate electrode, a source electrode, and a drain electrode, wherein a data voltage is applied to the source electrode; a storage capacitor Cstg connected to and disposed between the gate electrode of the driving transistor D-TFT and a power voltage VDDEL; and a reset transistor T6 configured to apply an initialization voltage VAR to an anode electrode of the light-emitting element OLED in response to a scan signal Scan3, wherein when the display device operates in a VRR (Variable Refresh Rate) mode for a refresh frame, an operating frequency of the scan signal Scan3 varies for an anode reset frame of the refresh frame anode reset frame.

In one implementation of the first aspect, when the display device operates in the VRR (Variable Refresh Rate) mode for the refresh frame, the refresh frame is divided into a first main display frame, a visibility improvement frame, and a second main display frame, wherein an operating frequency of the first main display frame is set to a first frequency, wherein an operating frequency of the visibility improvement frame is set to an intermediate frequency, wherein an operating frequency of the second main display frame is set to a second frequency, wherein the second frequency is smaller than the first frequency, wherein the intermediate frequency is smaller than the first frequency and is larger than the second frequency.

In one implementation of the first aspect, the operating frequency of the scan signal Scan3 is changed to a third frequency for the anode reset frame of the visibility improvement frame, wherein the third frequency is greater than the first frequency.

In one implementation of the first aspect, the operating frequency of the scan signal Scan3 is changed to the first frequency for the anode reset frame of the second main display frame.

In one implementation of the first aspect, when the display device operates in the VRR (Variable Refresh Rate) mode for the refresh frame, the refresh frame is divided into a first main display frame, a first visibility improvement frame, a second visibility improvement frame, and a second main display frame, wherein an operating frequency of the first main display frame is set to a first frequency, wherein an operating frequency of the first visibility improvement frame is set to a first intermediate frequency, wherein an operating frequency of the second visibility improvement frame is set to a second intermediate frequency, wherein an operating frequency of the second main display frame is set to a second frequency, wherein the second frequency is smaller than the first frequency, wherein the first intermediate frequency is set to a value between the first frequency and the second frequency, wherein the second intermediate frequency is set to a value between the first frequency and the second frequency and is smaller than the first intermediate frequency.

In one implementation of the first aspect, the operating frequency of the scan signal Scan3 is changed to a fourth frequency for the anode reset frame of each of the first visibility improvement frame, the second visibility improvement frame, and the second main display frame, wherein the fourth frequency is greater than the first frequency.

In one implementation of the first aspect, the operating frequency of the scan signal Scan3 is changed to a fourth frequency for the anode reset frame of the first visibility improvement frame, wherein the fourth frequency is greater than the first frequency.

In one implementation of the first aspect, the operating frequency of the scan signal Scan3 is changed to a third frequency for the anode reset frame of the second visibility improvement frame, wherein the third frequency is smaller than the fourth frequency and is greater than the first frequency.

In one implementation of the first aspect, the operating frequency of the scan signal Scan3 is changed to the first frequency for the anode reset frame of the second main display frame.

In one implementation of the first aspect, the pixel circuit further includes a transistor for applying an on-bias stress voltage to the source electrode of the driving transistor D-TFT in response to the scan signal Scan3 for the anode reset frame.

A second aspect of the present disclosure provides a display device comprising: a display panel including a plurality of pixel circuits, each pixel circuit having a light-emitting element OLED and a driving transistor D-TFT; and a gate driver for providing a scan signal Scan3 to the plurality of pixel circuits, wherein the scan signal Scan3 is set as a control signal for initializing an anode electrode of the light-emitting element OLED and for applying an on-bias stress voltage to a source electrode of the driving transistor D-TFT, wherein the gate driver is controlled so that in a VRR (variable refresh rate)-based operation for a refresh frame, an operating frequency of the scan signal Scan3 varies for an anode reset frame.

In one implementation of the second aspect, when the display device operates in the VRR (Variable Refresh Rate) mode for the refresh frame, the refresh frame is divided into a first main display frame, a visibility improvement frame, and a second main display frame, wherein an operating frequency of the first main display frame is set to a first frequency, wherein an operating frequency of the visibility improvement frame is set to an intermediate frequency, wherein an operating frequency of the second main display frame is set to a second frequency, wherein the second frequency is smaller than the first frequency, wherein the intermediate frequency is smaller than the first frequency and is larger than the second frequency.

In one implementation of the second aspect, the operating frequency of the scan signal Scan3 is changed to a third frequency for the anode reset frame of the visibility improvement frame, wherein the third frequency is greater than the first frequency.

In one implementation of the second aspect, the operating frequency of the scan signal Scan3 is changed to the first frequency for the anode reset frame of the second main display frame.

In one implementation of the second aspect, when the display device operates in the VRR (Variable Refresh Rate) mode for the refresh frame, the refresh frame is divided into a first main display frame, a first visibility improvement frame, a second visibility improvement frame, and a second main display frame, wherein an operating frequency of the first main display frame is set to a first frequency, wherein an operating frequency of the first visibility improvement frame is set to a first intermediate frequency, wherein an operating frequency of the second visibility improvement frame is set to a second intermediate frequency, wherein an operating frequency of the second main display frame is set to a second frequency, wherein the second frequency is smaller than the first frequency, wherein the first intermediate frequency is set to a value between the first frequency and the second frequency, wherein the second intermediate frequency is set to a value between the first frequency and the second frequency and is smaller than the first intermediate frequency.

In one implementation of the second aspect, the operating frequency of the scan signal Scan3 is changed to a fourth frequency for the anode reset frame of each of the first visibility improvement frame, the second visibility improvement frame, and the second main display frame, wherein the fourth frequency is greater than the first frequency.

In one implementation of the second aspect, the operating frequency of the scan signal Scan3 is changed to a fourth frequency for the anode reset frame of the first visibility improvement frame, wherein the fourth frequency is greater than the first frequency.

In one implementation of the second aspect, the operating frequency of the scan signal Scan3 is changed to a third frequency for the anode reset frame of the second visibility improvement frame, wherein the third frequency is smaller than the fourth frequency and is greater than the first frequency.

In one implementation of the second aspect, the operating frequency of the scan signal Scan3 is changed to the first frequency for the anode reset frame of the second main display frame.

In one implementation of the second aspect, the pixel circuit includes: the light-emitting element OLED configured to emit light based on a driving current; the driving transistor D-TFT configured to control the driving current, and including a gate electrode, the source electrode, and a drain electrode, wherein a data voltage is applied to the source electrode; a storage capacitor Cstg connected to and disposed between the gate electrode of the driving transistor D-TFT and a power voltage VDDEL; a reset transistor T6 configured to apply an initialization voltage VAR to an anode electrode of the light-emitting element OLED in response to the scan signal Scan3 for the anode reset frame; and a transistor configured to apply an on-bias stress voltage to the source electrode of the driving transistor D-TFT in response to the scan signal Scan3 for the anode reset frame.

According to embodiments, the response characteristics and the image quality characteristics at the low gray level in the operation in the VRR mode may be simultaneously improved.

Moreover, the visibility in the frequency change in operation in the VRR mode may be further improved.

Moreover, the low-speed operation may reduce the power consumption, and thus the display panel may operate at a low power level.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A display device comprising:

a pixel circuit, including:

a light-emitting element configured to emit light based on a driving current;

a driving transistor configured to control the driving current, and including a gate electrode, a source electrode, and a drain electrode, a data voltage being applied to the source electrode;

a storage capacitor connected to and disposed between the gate electrode of the driving transistor and a power voltage; and a reset transistor configured to apply an initialization voltage to an anode electrode of the light-emitting element in response to a scan signal, wherein when the display device operates in a Variable Refresh Rate mode for a refresh frame, an operating frequency of the scan signal for an anode reset frame varies according to an operating frequency of the refresh frame.

2. The display device of claim 1, wherein when the display device operates in the Variable Refresh Rate mode for the refresh frame, the refresh frame is divided into a first main display frame, a visibility improvement frame, and a second main display frame, wherein an operating frequency for the refresh frame of the first main display frame is set to a first frequency, wherein an operating frequency for the refresh frame of the visibility improvement frame is set to an intermediate frequency, wherein an operating frequency for the refresh frame of the second main display frame is set to a second frequency, wherein the second frequency is smaller than the first frequency, and wherein the intermediate frequency is smaller than the first frequency and is larger than the second frequency.

3. The display device of claim 2, wherein the operating frequency of the scan signal for the anode reset frame of the visibility improvement frame is changed to a third frequency, and wherein the third frequency is greater than the first frequency.

4. The display device of claim 3, wherein the operating frequency of the scan signal for the anode reset frame of the second main display frame is changed to the first frequency.

5. The display device of claim 1, wherein when the display device operates in the Variable Refresh Rate mode for the refresh frame, the refresh frame is divided into a first main display frame, a first visibility improvement frame, a second visibility improvement frame, and a second main display frame, wherein an operating frequency of the first main display frame is set to a first frequency, wherein an operating frequency of the first visibility improvement frame is set to a first intermediate frequency, wherein an operating frequency of the second visibility improvement frame is set to a second intermediate frequency, wherein an operating frequency of the second main display frame is set to a second frequency, wherein the second frequency is smaller than the first frequency, wherein the first intermediate frequency is set to a value between the first frequency and the second frequency, and wherein the second intermediate frequency is set to a value between the first frequency and the second frequency and is smaller than the first intermediate frequency.

6. The display device of claim 5, wherein the operating frequency of the scan signal is changed to a fourth frequency for the anode reset frame of each of the first visibility improvement frame, the second visibility improvement frame, and the second main display frame, and wherein the fourth frequency is greater than the first frequency.

7. The display device of claim 5, wherein the operating frequency of the scan signal is changed to a fourth frequency for the anode reset frame of the first visibility improvement frame, and wherein the fourth frequency is greater than the first frequency.

8. The display device of claim 7, wherein the operating frequency of the scan signal is changed to a third frequency for the anode reset frame of the second visibility improvement frame, and wherein the third frequency is smaller than the fourth frequency and is greater than the first frequency.

9. The display device of claim 8, wherein the operating frequency of the scan signal is changed to the first frequency for the anode reset frame of the second main display frame.

10. The display device of claim 1, wherein the pixel circuit further includes a transistor for applying an on-bias stress voltage to the source electrode of the driving transistor in response to the scan signal for the anode reset frame.

11. The display device of claim 1, wherein the scan signal is set as a control signal for initializing the anode electrode of the light-emitting element and for applying an on-bias stress voltage to the source electrode of the driving transistor.

12. A display device comprising:

a display panel including a plurality of pixel circuits, each pixel circuit having a light-emitting element and a driving transistor; and a gate driver for providing a scan signal to the plurality of pixel circuits, wherein the scan signal is set as a control signal for initializing an anode electrode of the light-emitting element and for applying an on-bias stress voltage to a source electrode of the driving transistor, wherein the gate driver is controlled so that in a Variable Refresh Rate mode for a refresh frame, an operating frequency of the scan signal for an anode reset frame varies according to an operating frequency of the refresh frame.

13. The display device of claim 12, wherein when the display device operates in the Variable Refresh Rate mode for the refresh frame, the refresh frame is divided into a first main display frame, a visibility improvement frame, and a second main display frame, wherein an operating frequency for the refresh frame of the first main display frame is set to a first frequency, wherein an operating frequency for the refresh frame of the visibility improvement frame is set to an intermediate frequency, wherein an operating frequency for the refresh frame of the second main display frame is set to a second frequency, wherein the second frequency is smaller than the first frequency, and wherein the intermediate frequency is smaller than the first frequency and is larger than the second frequency.

14. The display device of claim 13, wherein the operating frequency of the scan signal for the anode reset frame of the visibility improvement frame is changed to a third frequency, and wherein the third frequency is greater than the first frequency.

15. The display device of claim 14, wherein the operating frequency of the scan signal for the anode reset frame of the second main display frame is changed to the first frequency.

16. The display device of claim 12, wherein when the display device operates in the Variable Refresh Rate mode for the refresh frame, the refresh frame is divided into a first main display frame, a first visibility improvement frame, a second visibility improvement frame, and a second main display frame, wherein an operating frequency of the first main display frame is set to a first frequency, wherein an operating frequency of the first visibility improvement frame is set to a first intermediate frequency, wherein an operating frequency of the second visibility improvement frame is set to a second intermediate frequency, wherein an operating frequency of the second main display frame is set to a second frequency, wherein the second frequency is smaller than the first frequency, wherein the first intermediate frequency is set to a value between the first frequency and the second frequency, and wherein the second intermediate frequency is set to a value between the first frequency and the second frequency and is smaller than the first intermediate frequency.

17. The display device of claim 16, wherein the operating frequency of the scan signal is changed to a fourth frequency for the anode reset frame of each of the first visibility improvement frame, the second visibility improvement frame, and the second main display frame, and wherein the fourth frequency is greater than the first frequency.

18. The display device of claim 16, wherein the operating frequency of the scan signal is changed to a fourth frequency for the anode reset frame of the first visibility improvement frame, and wherein the fourth frequency is greater than the first frequency.

19. The display device of claim 18, wherein the operating frequency of the scan signal is changed to a third frequency for the anode reset frame of the second visibility improvement frame, and wherein the third frequency is smaller than the fourth frequency and is greater than the first frequency.

20. The display device of claim 19, wherein the operating frequency of the scan signal is changed to the first frequency for the anode reset frame of the second main display frame.

21. The display device of claim 12, wherein the pixel circuit includes:

the light-emitting element configured to emit light based on a driving current;

the driving transistor configured to control the driving current, and including a gate electrode, the source electrode, and a drain electrode, wherein a data voltage is applied to the source electrode;

a storage capacitor connected to and disposed between the gate electrode of the driving transistor and a power voltage;

a reset transistor configured to apply an initialization voltage to an anode electrode of the light-emitting element in response to the scan signal for the anode reset frame; and a transistor configured to apply an on-bias stress voltage to the source electrode of the driving transistor in response to the scan signal for the anode reset frame.

* * * * *